Dec. 27, 1932.   F. E. CARLSON   1,892,264
SCALES
Filed July 30, 1929
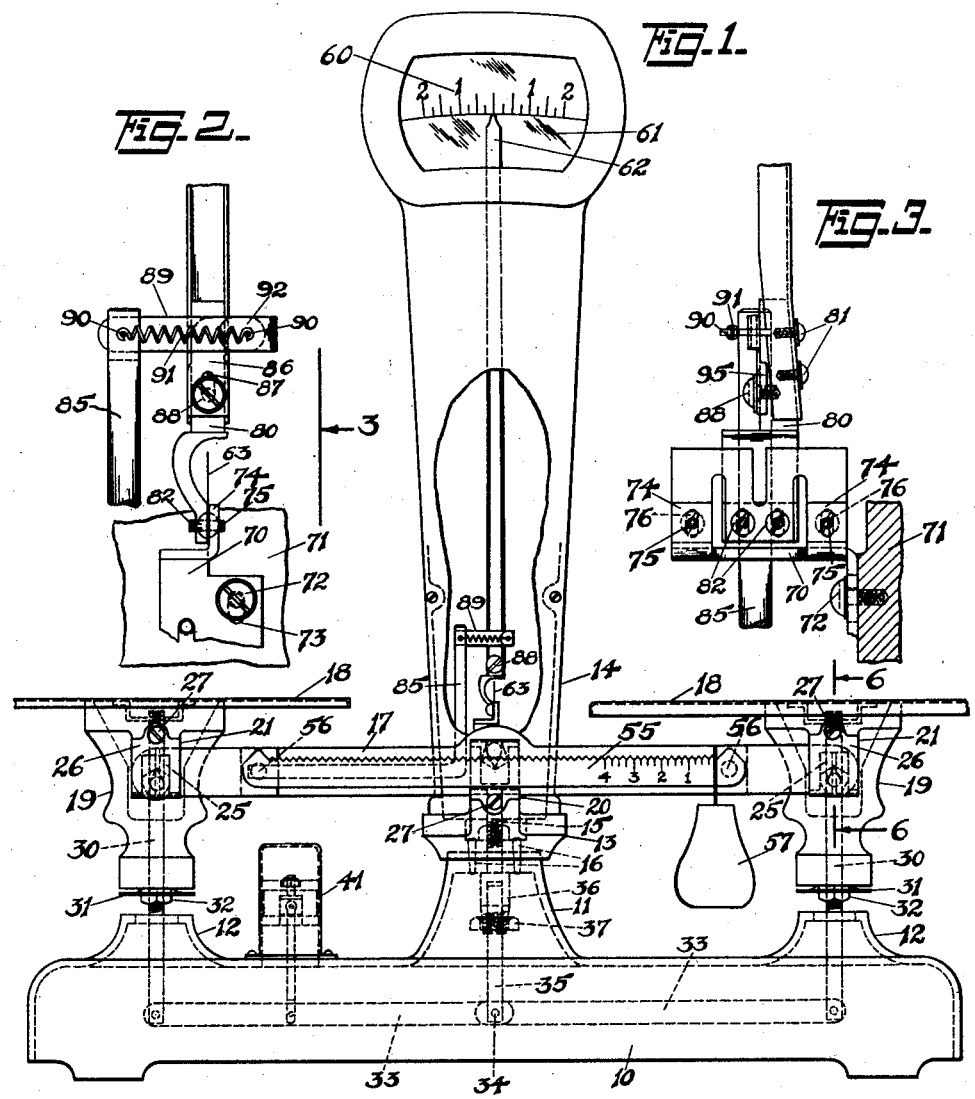
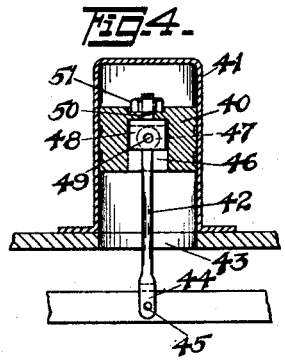
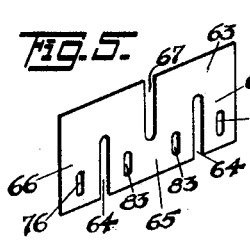
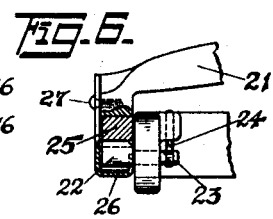
Inventor
Frederick E Carlson
By his Attorneys Patented Dec. 27, 1932

1,892,264

UNITED STATES PATENT OFFICE

FREDERICK E. CARLSON, OF NEW BRITAIN, CONNECTICUT, ASSIGNOR TO LANDERS, FRARY & CLARK, OF NEW BRITAIN, CONNECTICUT, A CORPORATION OF CONNECTICUT

SCALES

Application filed July 30, 1929. Serial No. 382,093.

This invention relates to weighing scales and more particularly to scales of the even-balance type.

It is an object of the invention to make the scales accurate and durable, and to simplify and perfect the construction.

With this general object in view, the invention consists in the features, combinations, arrangements, and details of construction which will first be described in connection with the accompanying drawing and then more particularly pointed out.

In the drawing:

Figure 1 is a front elevational view of weighing scales constructed in accordance with the present invention;

Figure 2 is a front elevational view of a fragment of the construction on an enlarged scale;

Figure 3 is a side elevational view, looking from the right as in Figure 2;

Figure 4 is a sectional elevation of a further detail of construction;

Figure 5 is a perspective view of the torsion spring employed;

Figure 6 is a sectional view as on line 6—6 of Figure 1.

Referring to the drawing in detail, the illustrated embodiment comprises a base 10, advantageously of hollow construction. In the example, the base is formed with a tical central loss 11 and vertical end bosses 12. A flange 13 is positioned on the central boss and a vertically elongated casing 14 on the flange, the casing being hollow for the accommodation of certain parts of the apparatus as presently described. The casing and flange are rigidly assembled and fastened on the boss, as by a suitably designed central bolt 15. Dowel pins 16 or the like may be employed between the flange and the boss to prevent relative rotation of said parts.

The apparatus further comprises a scale beam 17 and scale pans 18 having depending bases 19. As shown, the scale beam is centrally pivoted above the base 10 and the scale pans pivotally supported on the ends of the beam. In the exemplification, the flange 13 is provided with a laterally extending member 20 and the pans with similar members 21. The members 20, 21 carry bearings for the pivots of the scale beam. The bearings employed are knife bearings. While the construction is capable of variations, in that here shown as an example, the scale beam is provided with rocker knife-edge members 22 which extend laterally from the beam and have trunnion portions 23 passing through holes in the beams and held positively against rotation in said holes. To this end, the ends of said portions project through the opposite sides of the beam and are pinned to the beam as at 24 (Figure 6). The knife edges bear on hardened members or plates 25, as for example, of special alloy steel, in the lateral members 20, 21. These plates are detachable and may be set in openings in the respective parts and retained in position by holding means, such as the sheet metal members 26 which are fastened in place by set-screws 27 or the like. These features allow convenient assembly of the parts and produce a very sensitive, durable construction with little friction.

The weighing pans are advantageously equipped with stems 30 which extend down vertically through the end bosses into the hollow base of the apparatus. These stems carry bumper means for engaging the bosses and taking blows off the knife edges during the use of the scales. In the embodiment shown herein, the bumpers are steel spring washers 31 which are positioned on the stems and clamped against the lower ends of the pan bases by nuts 32. The lower ends of stems 30 are connected by a brace rod 33 which maintains the horizontal positions of the pans and which is advantageously disposed within the hollow base of the apparatus and pivoted centrally as at 34, as, for example, on a rod 35. The rod shown is hung or suspended within the base. To this end, the upper end of the rod may be clamped within the hollow, enlarged head of bolt 15. The exemplification shows the head of the bolt tapered and split and a locknut 37 fitting on said tapered portion to clamp the rod within firmly in position. The rod may be adjusted within the head to any desired position prior to being clamped by the nut.

Means are provided for retarding or cushioning the movements of the scales. Although capable of various constructions, in that shown as an example, Fig. 4, the retarding means comprise a dash-pot construction embodying a piston 40 adapted to ride within a hollow cylinder 41 mounted vertically on top of the base and closed at the top to provide an air cushion within. The piston is connected to the brace rod by a link or connecting rod 42, which extends from the piston or the brace rod through an opening 43 in the base. In this embodiment the link is pivoted at one end to the piston and at the other end to the brace rod. To this end, the link has a fork 44 at one end to engage the brace rod and a pin 45 extends through the legs of the fork and through the rod to provide the pivoted connection. The other end of the link passes into a recess 46 in the piston and is advantageously equipped with an eyelet 47, extending within the bolt head 48. A pin 49 passes through the bolt head and through the eyelet and acts to pivot the link to the piston. The bolt 50 extends through the end of the piston and is bolted on the exterior thereof by nut 51. The head is thus clamped firmly against the end of the recess. This construction is simple and allows convenient assembly of the parts. It further provides free play in the pivotal connection of the link to the piston, permits the piston to accommodate itself in the cylinder and to ride smoothly therein without binding.

The scale beam is equipped with a movable weight acting along a calibrated scale. In the exemplification, such scale is provided by a calibrated bar 55, which is supported in substantial parallelism with the beam and fastened thereto at its ends by suitable fastening elements 56. The movable weight 57 is suspended from the bar and adapted to be moved and adjusted thereon to balance the beam, as is common with this type of apparatus. The upper edge of the bar is notched in the usual manner to provide various increments on the scale.

In conjunction with this apparatus, a corrective indicator is provided. In the form of the invention shown, the corrective indicator includes a calibrated scale 60 mounted within and near the top of casing 14 and visible through a window 61 in the casing. A pointer 62 is movable over the scale so as to indicate weight. In this exemplification, the pointer is mounted at its lower end within the casing on a torsion spring. This spring is such as to bias the pointer to its equilibrium or zero position, both laterally and angularly. Although capable of various constructions, the torsion spring here shown as an example comprises a plane sheet metal member 63 having two spaced slits 64 extending from the bottom edge partly through the body. The slits are advantageously arranged substantially parallel to each other and to the side edges of the spring so as to provide a downwardly-extending central tongue 65 and end tongues 66 in said spring. The central tongue is used to support the pointer, while the end tongues are utilized to mount the spring. The spring is further provided with a central slit 67 which extends from the top edge partly through the tongue 65 and augments the resiliency of the spring.

Means are provided for mounting the spring in service. The means exemplified include a bracket 70, which may advantageously be of sheet metal construction. The bracket is shown arranged with one leg horizontal and with the other vertical, the vertical leg being fastened to a suitable stationary part 71 of the apparatus. The fastening means may conveniently be set-screws 72 which extend through slots 73 in the vertical leg of the bracket into the stationary part. The slots allow some adjustment of the bracket. The horizontal leg of the bracket is equipped with up-turned edge extensions 74 which are spaced and to which the end tongues 66 of the spring are fastened as by set-screws 75. The openings in the spring for the set-screws may be slots so that the spring may be adjusted to some extent with respect to the bracket.

As already stated, the pointer is mounted on the central tongue of the spring. In one arrangement, the pointer is carried on a supporting member and the latter is attached to the central tongue. The supporting member 80 may be of suitable design and shape so as to seat partly in the lower end of the pointer, herein shown as of channel section. Such member is fastened therein by suitable fastening elements 81. The lower end of the supporting member is attached to the central tongue as by set-screws 82 which also pass through slots 83 in the spring, thus permitting some adjustment of the block with respect to the spring.

Means are provided for moving the pointer in correspondence with the movement of the scale beam and against the action of the torsion spring. The exemplification shows the means embodied in a connection which is positive and tensioned. The connection conveniently includes an L-shaped rod 85 having one leg arranged parallel to the scale beam and attached near its free end to one end thereof, as by one of the fastening elements 56. The other leg of said rod is positioned in spaced, substantially parallel relation to the pointer and connected thereto. To this end, the supporting member may have mounted thereon a smaller L-shaped element 86. The element 86 is advantageously of sheet metal formation, having a slot 87 for a fastening screw 88 which extends into the member 80 through said slot. The slot provides for a little adjustment of the element 86 with respect to member 80. One leg of element 86 is arranged parallel to the pointer and member 80, and has its edges partly crimped or bent over on said member as at 95. The other leg extends transversely to the pointer, as illustrated in Figure 2. A connecting member 89 advantageously of flat formation extends between the end of the transverse leg and the end of the adjacent leg of rod 85. The connecting member is pivoted at its ends to said parts as by pins 90. A spring 91 is tensioned between the pins 90 to maintain a firm resilient assembly of the parts. The end of the transverse leg of element 86 may advantageously be bent back as at 92 over the connecting member so as to provide a better assembly of the parts. The connection acts on the supporting member and not on the pointer directly. Hence, the pointer is in no way injured, bent or flexed.

In the use of the apparatus, the object to be weighed is placed upon one pan, and known weights upon the other. The known weights are selected so as to provide as near a state of balance or equilibrium as is possible thereby. The weight 57 is now moved along bar 55 to the notch which gives the nearest state of balance. Any error in balance is now represented on the corrective indicator, the pointer of which is moved by rod 85 against the action of the torsion spring. The correct weight may now be ascertained by adding the weights on the pan and the amount on the scale bar and correcting by adding or subtracting the amount on scale bar 60, depending on which side the pointer swings. In this way, the weight of the object is determined very accurately.

What is claimed is:

1. In a weighing apparatus, and in combination a pointer, a scale cooperating therewith, spring supporting means for the pointer biasing the pointer laterally and angularly to its equilibrium position, a scale beam, and a tensioned connection between the scale beam and the pointer.

2. In a weighing apparatus, and in combination a pointer, a scale cooperating therewith, a spring supporting the pointer and comprising a sheet metal member having a tongue portion, means for attaching the pointer to the tongue portion, means for mounting the member in service, a scale beam, and a connection between the scale beam and pointer.

3. In a weighing apparatus, and in combination a pointer, a scale cooperating therewith, a spring supporting the pointer and comprising a sheet metal member having spaced slits extending from one edge partly through the member and arranged substantially parallel to each other and to the side edges of the member, said slits defining a central tongue and end tongues, means for attaching the pointer to the central tongue, means for fastening the end tongues in service, a scale beam, and a connection between the scale beam and pointer.

4. In a weighing apparatus, and in combination a pointer, a scale cooperating therewith, a spring supporting the pointer and comprising a sheet metal member having substantially horizontal and vertical edges, spaced slits extending from one horizontal edge partly through the member and arranged substantially parallel to each other and to the side edges of the member, said slits defining a central tongue and end tongues, said member having a further slit extending from the other horizontal edge partly through the central tongue, means for attaching the pointer to the central tongue, means for fastening the end tongues in service, the spring member having slots for fastening elements to provide adjustability, a scale beam, and a connection between the scale beam and pointer.

5. In a weighing apparatus, and in combination a pointer, a scale cooperating therewith, spring biasing means for the pointer, a scale beam, and a connection between the scale beam and pointer, said connection including a link pivoted at its ends and a spring tensioned between the pivots.

6. In a weighing apparatus, and in combination a pointer, a scale cooperating therewith, a supporting member for the pointer, spring mounting means for the supporting member, a scale beam, and a positive spring tensioned connection between the scale beam and supporting member.

7. In a weighing apparatus, and in combination a scale beam, a pivot for said beam comprising a knife-edge member extending laterally from the beam, a trunnion portion associated with said member and extending through the beam and pinned against rotation on its opposite end, a bearing for the knife-edge member embodying a hardened member against which the knife edge bears.

8. In combination with two associated members, a pivotal connection for said members comprising a knife-edge element having a trunnion portion passing through part of one of said members, a pin for securing the trunnion portion against rotation, and a hardened bearing for the knife-edge carried by the other of said members.

9. In a weighing apparatus, and in combination a base, a scale beam mounted above the base, a pan supported by the beam, a knife edge bearing between pan and beam, a vertical stem associated with the pan and extending downward therefrom, and a washer member carried by the stem and adapted to strike the base to limit downward movement and take blows off the bearing.

10. In a weighing apparatus, and in combination a scale beam, and a dash-pot construction for retarding movements of the beam, said construction embodying a fixed cylinder, a piston movable within, and a connecting rod pivoted to the piston in a way to swing with respect to the piston and cylinder in the plane of movement of the beam.

11. In a weighing apparatus, and in combination a base, a scale beam mounted above the base, pans carried at the ends of the beam, stems extending from said pans into the base, a pivoted brace rod between the stems, a dash-pot construction comprising a cylinder mounted on the base, a piston within the cylinder, and a connecting rod pivoted at its ends to the piston and to the brace rod.

12. In a weighing apparatus, and in combination, a pointer, a scale cooperating therewith, a stationary bracket, a leaf spring having a plurality of tongues, one of said tongues being connected with said pointer to support the same, the other of said tongues being secured to said bracket, a scale beam, and a connection between the scale beam and the pointer.

13. In a weighing apparatus, and in combination, a pointer, a scale cooperating therewith, a stationary bracket, spring means supporting the pointer from said bracket, a scale beam, and means including a tensioning spring for connecting the scale beam with the pointer.

14. In a weighing apparatus, and in combination, a scale beam, a pivot for said beam comprising a knife-edge member extending laterally from the beam, a trunnion portion on said knife-edge member extending into said beam, means for preventing rotation of said trunnion portion, and a bearing for the knife-edge member.

In testimony whereof, I have hereunto set my hand.

FREDERICK E. CARLSON.